US008485802B2

(12) United States Patent
Bachmann et al.

(10) Patent No.: US 8,485,802 B2
(45) Date of Patent: Jul. 16, 2013

(54) PUMP WITH MULTIPLE VOLUME STREAMS

(75) Inventors: Josef Bachmann, Obersinn (DE); Rolf Schwarze, Aalen (DE)

(73) Assignee: GKN Sinter Metals Holding GmbH, Radevormwald (DE)

( * ) Notice: Subject to any disclaimer, the term of this patent is extended or adjusted under 35 U.S.C. 154(b) by 93 days.

(21) Appl. No.: 11/410,473

(22) Filed: Apr. 24, 2006

(65) Prior Publication Data

US 2006/0280636 A1    Dec. 14, 2006

Related U.S. Application Data

(63) Continuation of application No. PCT/EP2004/012222, filed on Oct. 28, 2004.

(30) Foreign Application Priority Data

Oct. 29, 2003 (DE) .................................. 103 50 632

(51) Int. Cl.
*F01C 20/18* (2006.01)
*F04C 2/10* (2006.01)

(52) U.S. Cl.
USPC ............................... 418/16; 418/15; 418/171

(58) Field of Classification Search
USPC .................. 418/15, 16, 29, 30, 31, 61.3, 196, 418/171
See application file for complete search history.

(56) References Cited

U.S. PATENT DOCUMENTS

| | | | | |
|---|---|---|---|---|
| 2,898,862 A * | 8/1959 | Brundage | ...................... | 418/171 |
| 2,948,229 A * | 8/1960 | Brundage | ........................ | 418/15 |
| 3,026,809 A * | 3/1962 | Anderson et. al. | ............ | 418/171 |
| 3,045,778 A * | 7/1962 | Mosbacher | .................. | 184/6.23 |
| 3,106,897 A * | 10/1963 | Johnson | ........................ | 418/171 |
| 3,690,792 A * | 9/1972 | Petersen | ...................... | 418/61.3 |
| 3,778,198 A * | 12/1973 | Giversen | ...................... | 418/61.3 |
| 5,547,349 A * | 8/1996 | Kimura et al. | .................. | 417/282 |
| 6,374,603 B1 * | 4/2002 | Morita et al. | .................... | 60/421 |
| 6,474,751 B1 * | 11/2002 | Yamaguchi et al. | ........ | 303/116.4 |
| 6,540,637 B2 * | 4/2003 | Bachmann et al. | ............ | 475/162 |
| 6,685,437 B2 * | 2/2004 | Koenig et al. | .................... | 417/15 |
| 6,761,547 B2 * | 7/2004 | Takagi et al. | .................. | 418/171 |
| 6,835,054 B2 * | 12/2004 | Morita | ............................. | 418/15 |
| 7,011,069 B2 * | 3/2006 | Ono et al. | .................. | 123/196 R |

FOREIGN PATENT DOCUMENTS

| | | |
|---|---|---|
| DE | 196 22 688 A1 | 12/1997 |
| FR | 2 689 185 | 10/1993 |
| JP | 01-096 484 | 4/1989 |
| WO | WO 00/61947 | 10/2000 |

* cited by examiner

*Primary Examiner* — Mary A Davis
(74) *Attorney, Agent, or Firm* — Woodcock Washburn LLP (57) ABSTRACT

Disclosed is a pump for generating at least two volume flows having a different pressure. Said pump comprises a pump cover, a pump housing, and a wheel set that is eccentrically mounted therein. The pump housing is provided with a suction slot and a pressure slot which are separated from each other by means of a first sealing web and a second sealing sew that is located opposite therefrom. The pressure slot is subdivided into a high pressure chamber and a low pressure chamber with the air of at least one additional sealing web, each pressure chamber being provided with a delivery port.

14 Claims, 10 Drawing Sheets

PUMP WITH MULTIPLE VOLUME STREAMS

CROSS-REFERENCE TO RELATED APPLICATIONS

This is a continuation of application number PCT/EP2004/012222 filed Oct. 28, 2004, which claims priority to German application number 103 50 632.2-15 filed Oct. 29, 2003, the entireties of each is incorporated herein by reference.

BACKGROUND OF THE INVENTION

The invention concerns a pump for generating at least two volume streams, in particular, a lubrication pump for internal combustion engines, drive pump and a pump for comparable applications.

Numerous lubrication pumps are known from the state of the art. These pumps deliver a relatively low maximum pressure level with a maximum of 7 to 8 bar. It has been demonstrated in many areas of application in the automobile industry—for camshaft adjusters, motor lubrication, and transmissions, for example—that pumps are required, which are cost-efficient and optimally constructed.

For example, camshaft adjusters are controlled by a lubrication pump, which, due to the limited pressure level in limited conditions, cannot ensure the function of the camshaft adjuster, because the pressure level of the lubrication pump is too low. A known solution is to employ a second pump as a high pressure pump for the maintenance of the camshaft adjuster. The higher pressure leads to a faster adjustment times by the adjuster.

It is common knowledge about transmissions that large volume pumps are employed with a volume stream of approximately 12 to 20 $cm^3$/cycle, that circulate this volume stream at approximately 10 to 70 bar, even though only a small portion of the volume stream with these high pressures is required for changing gears and activating the clutch. Due to this, there are large losses of efficiency because of the pumps.

For motor lubrication, cost-efficient tandem pumps are employed, which are constructed with two sets of gears and two pump housing halves, whereby one pump-half is shut-down via a bypass to adjust these pumps at a certain pressure and volume stream level whereby a corresponding loss of efficiency occurs. As a basic principle, geared rotor sets are known from DE-A-196 46 359 and DE-Z-199 22 792. These are composed of an external ring having internal toothing and an eccentrically situated, externally-toothed gear located within the external ring, whereby the internal toothing is composed of rotatable rollers in the external ring, and has one more tooth than the external toothing, whereby an essentially smaller, fine-toothed module is superimposed on the external toothing of the gear, and each roller has a fine-toothing of the same module around its circumference, into which the teeth of the gear engage.

The function of the geared rotor set results in the following: a driving torque acts on the inner rotor via a drive shaft, turning the inner rotor. By this means, power is transferred from the toothed inner rotor to the epicyclic, or planetary gear. This produces percussive energy through the center of the planetary gear, on the one hand, and also a tangential force that produces torque on the planetary gear, whereby the percussive energy, which affects the bearing ring, sets the bearing ring into rotation.

The geared rotor set described above is suited to produce high pressures.

SUMMARY OF THE INVENTION

It is the object of the invention to specify a pump that, by means of a simple configuration of design engineering, is able to produce at least two volume streams having a different pressure, whereby this pump shall demonstrate a minimal overall size, and must be simple and cost efficient to manufacture.

The problem is solved in accordance with the invention by a pump for the generation of at least two volume streams with a different pressure, composed of a pump cover, a pump housing, an eccentrically situated wheel set located with the pump housing, whereby the pump housing has a suction slit and a pressure slit, which are separated from each other by an initial sealing web and also by a second sealing web, which is located diametrically opposite from the initial sealing web. The pressure slit is partitioned by at least one additional sealing web into a high pressure chamber and a low pressure chamber, with each pressure chamber having a pressure port. The volume stream pumped from the suction slit into the pressure slit is divided into two volume streams by the partitioning of the pressure slit, by means of the additional sealing web, into a high pressure chamber and a low pressure chamber. Thus a lower pressure of, for example, 5 bar is found in the low pressure chamber and a higher pressure of, for example, 80 bar is found in the high pressure chamber. The lower pressure of 5 bar is sufficient to guaranty the motor lubrication and the higher pressure of 80 bar can be used, for example, to operate the camshaft adjuster.

In the preferred exemplary embodiment of the invention, the gear set is in the form of an epicyclic or planetary gear. A planetary gear system is radially self sealing, that means that the displacement chambers are sealed in an absolutely leakproof fashion from each other by a micro toothing. One displacement chamber is formed by two fine-toothed teeth of the inner rotor and by two planetary gears, which are in contact with them. Due to the sealing webs, the planetary gears are axially sealed. Rotating the gear set causes the volume of the displacement chamber to be reduced sinusoidally into pressure chamber 1, through which a portion of the medium in the low pressure chamber is displaced. During the traverse of the additional sealing web, the remaining portion of the medium is enclosed absolutely within the displacement chamber of the planetary rotor, and pumped into the high pressure chamber, where the remainder of the medium is displaced up to the top dead center of the gear set.

As a basic principle, it is possible that the pressure slit can be subdivided by the provision of additional sealing webs, so that additional pressure chambers and volume streams can be produced, whereby these are limited only by the size of the gear set and the number of its teeth. The pressure difference between the low pressure chamber and the high pressure chamber can attain up to 120 bar by means of the pump according to the invention.

In a practical embodiment of the invention, the gear set is constructed as a gerotor gear system or as a duocentric gear system. Only a smaller pressure difference between the low pressure chamber and the high pressure chamber, namely a pressure difference of approximated 20 bar at the most, can be achieved by the use of these [gerotor or duocentric] gear system types.

In the preferred embodiment of the invention, a dummy suction slit and a dummy pressure slit are incorporated into the pump cover, are located opposite the suction slit and the pressure slit, and have the same geometry as these ['real' slits]. The two dummy slits prohibit axial forces from affecting the gear system.

In the preferred embodiment of the invention, the additional sealing web is located at an angle $\alpha_1$ of 30° to 120° to the axis.

In an additional preferred embodiment of the invention, the additional sealing web extends over an angle $\alpha_2$ of 20° to 80° degrees. The angles $\alpha_1$ and $\alpha_2$ are of equal size.

In a particularly preferred embodiment of the invention, the additional sealing web is relocatable in the pump cover and the pump housing. By this means, it is possible to change the volume streams and volume pressures during the operation of the pump dependent upon the values stipulated. A moveable sealing web separates the pressure slit into a low pressure chamber and a high pressure chamber. The sealing web is, for example, connected to a control piston that is located perpendicular to a drive shaft of the internal rotor, whereby the required limit pressure is set by a pre-stressed pressure spring, which affects the control piston. A bypass control is located in the area of the initial sealing web. A bypass bore hole connects the high pressure chamber with the suction slit. The bypass bore hole is closed or opened by the disposition of a regulating pin. The position of the regulating pin disconnects the bypass bore hole and separates the high pressure chamber from the suction slit by means of the initial sealing web. The position of the regulating pin opens the bypass bore hole and makes a connection (Bypass) between the high pressure chamber and the suction slit. The medium displaced into the high pressure chamber can thus flow out unpressurized into the suction slit. The control by means of the regulating pin can be accomplished cost efficiently by a 2/2 electric directional control valve that has a fast response time. By this means, the possibility exists to quickly connect and disconnect the volume stream of the high pressure chamber. When the bypass bore hole is closed, pressure is increased in the high pressure chamber, which pressure affects the control piston via a pressure channel. When the preset limit pressure has-been exceeded in the high pressure chamber, the control piston is shifted against the tension of the pressure spring. Because the control piston is connected with the sealing web, the sealing web is shifted opposite the running direction of the planetary gear. The [size of the] high pressure chamber is increased by this [action] and the volume stream increases correspondingly.

In an additional preferred embodiment of the invention, the size of the high pressure chamber and/or the low pressure chamber is variable. By this means, the volume streams, or rather the volume pressures can be varied during the operation of the pump dependent upon the values stipulated, in a similar fashion [to the previous preferred embodiment].

In a practical embodiment of the invention, the pump cover, the pump housing, and/or the gear system are constructed out of sintered metal. The construction using sintered metal makes possible a simple and cost efficient fabrication of the components, on the one hand, and the emergency running properties are increased, on the other hand, because the lubricant can be incorporated into the pores.

In a particularly preferred embodiment of the invention, the pump is used for the operation of a camshaft adjuster, for engine lubrication, for transmission lubrication and/or support for the gear shift and for all other uses in the automotive field and other fields with comparable usage specifications. For example, an initial volume stream can be employed for engine lubrications, whereby the pump could offer a pressure of 6 bar maximum. A second volume stream is required for operating the camshaft adjuster, whereby the pump could offer a pressure between 40 bar and 100 bar. When the camshaft adjuster is operated at higher pressures, the adjustment time of the adjuster becomes faster. By this means, a quieter engine operation and a simultaneous decrease in the idle-running speed to 450-500 revolutions per minute is made possible. The exhaust-gas emission before the catalytic converter and fuel consumption are correspondingly reduced. Furthermore, performance, torque, and overall efficiency of the motor at the idle-running speed of 450-500 revolutions per minute are improved. The overall size of the adjusters can be reduced considerably. The leads to a reduction in the rotating weight and thus a reduction in overall weight. Furthermore, the locking mechanism on the camshaft adjuster can be dispensed with and an abatement of the engine idle-running speed from 650 revolutions per minute to 450-500 revolutions per minute is possible. By this means, fuel is saved, a faster and more effective adjustment of the camshaft is possible, and a smaller overall size of the pump is made possible. In addition, a weight reduction occurs due to the smaller size of the pump and larger production tolerances can be accepted, whereby cost savings are made possible.

In an additional preferred embodiment of the invention, both volume streams are controllable. An additional possible application of the pump according to the invention, occurs in an automatic transmission or a double-clutch transmission, for example. At the present, the state of the art is such, that the entire transmission lubricant has to be circulated by a pump at up to 20 bar, even though only a small portion of the transmission lubricant requires this [amount of] pressure for shifting gears. By means of the pump, according to the invention, it is possible to so divide the volume streams and pressures, that the volume stream and pressure for the lubrication of the transmission, as well as that for the gear shifting, can be set. By using a pump, according to the invention, the power loss can be markedly reduced and the deterioration of the lubricant due to the lowering of the idle-running speed can be likewise reduced. This can be demonstrated by the following example:

Pump for an Automatic Transmission According to the State of the Art:

The specification for the pump is that it should circulate 28 rpm maximum at a pressure of 20 bar.

$$P = Q*p/600 = 28 \text{ l/min} * 20/600 = 0.93 \text{ KW}$$

Pump for an Automatic Transmission with a Pump According to the Invention:

25% of the volume stream is set at 20 bar for shifting gears and 75% of the volume stream is set at 3 bar for transmission lubrication.

$$7 \text{ l/min} * 20/600 + 21 \text{ l/min} * 3/600 = 0.335 \text{ KW}$$

This results in a power savings by the pump according to the invention of approx. 64%.

In addition, by increasing the pressure to 50 bar and reducing the volume stream correspondingly, it is possible to reduce the time required for shifting, and the hydraulic plungers and cylinders can be markedly reduced in size, whereby constructed size, weight, and costs are reduced.

Pump for a CVT Transmission (Continuously Variable Transmission) According to the State of the Art:

The state of the art is similar to that for an automatic transmission. High pressure is required in a CVT transmission for the adjustment of the sprocket wheel (belt pulley). A radial piston pump is used.

Specifications: Radial Piston Pump: 18.2 cm³/cycle constant pump
    Revolutions: 6000 rpm
    Pressure: 60 bar
    Volume stream: 30 rpm
    A simplified comparative analysis is executed as follows:
1. Radial Piston Pump:

$$Md = V*p(20*pi) = 18.2*60/(20*pi) = 17.37 \text{ Nm}$$

$$P = Md*U/min/9500 = 17.37*6000/9500 = 10.97 \text{ KW}$$

2. Pump According to the Invention.
⅓ of the volume stream at 60 bar, ⅔ of the volume stream at 5 bar.

$$6.06*60/(20*pi) + 12.12*5/(20*pi) = 6.74 \text{ Nm}$$

$$6.74 \text{ Nm}*6000/U/min9500 = 4.25 \text{ KW}$$

A power savings of 61.2% is realized by this means. Both example calculations show purely hydraulic performance: no friction losses, etc. were allowed for. In addition, it is possible to control both volume streams, whereby an additional power savings is possible.

In the state of the art, for example, suction-controlled radial piston pumps are employed, which lead to major foaming and heating of the medium, and the rated input of the pump strongly diminishes the entire efficiency of the CVT transmission.

In some applications (double-clutch transmissions), the volume stream of the high pressure chamber is required only for a short period of time when changing gears. It would be a great advantage to divert, unpressurized, the volume stream of the high pressure chamber (approx. 30-40 bar), during the times it is not required, into the suction area and reconnect it when changing gears by means of a bypass [system]. In addition it would be an advantage to raise the volume stream of the high pressure chamber for the short term when changing gears. This would markedly shorten the shift cycle. By use of a variable sealing web 11, this would be cost efficiently possible. These procedures markedly reduce the rated input of the pump.

BRIEF DESCRIPTION OF THE DRAWINGS

The invention is explained in a more detailed fashion according to schematic diagrams, which show:

FIG. 1 A pre-fabricated pump housing in which a planetary gear set is eccentrically located, FIG. 2 A cross-section [along the line] A-A from FIG. 1. Cross-section along the line C-C shows the pump cover 1 with the suction and pressure slits (state of the art), FIG. 3 A cross-section along the line B-B from FIG. 1, FIG. 4 A view [cross-section] along the line D-D from FIG. 3 (pump cover 1), FIG. 5 A view of the pump flange 4 with the alignment of the dummy suction slit and the dummy pressure slit, FIG. 6 A representation of the displacement chamber 20, FIG. 7 A possibility for configuring the moveable sealing web, FIG. 8 An image of a gerotor gear system, FIG. 9 An image of a duocentric gear system, FIG. 10 A bypass control.

DETAILED DESCRIPTION OF ILLUSTRATIVE EMBODIMENTS

Figure 1:
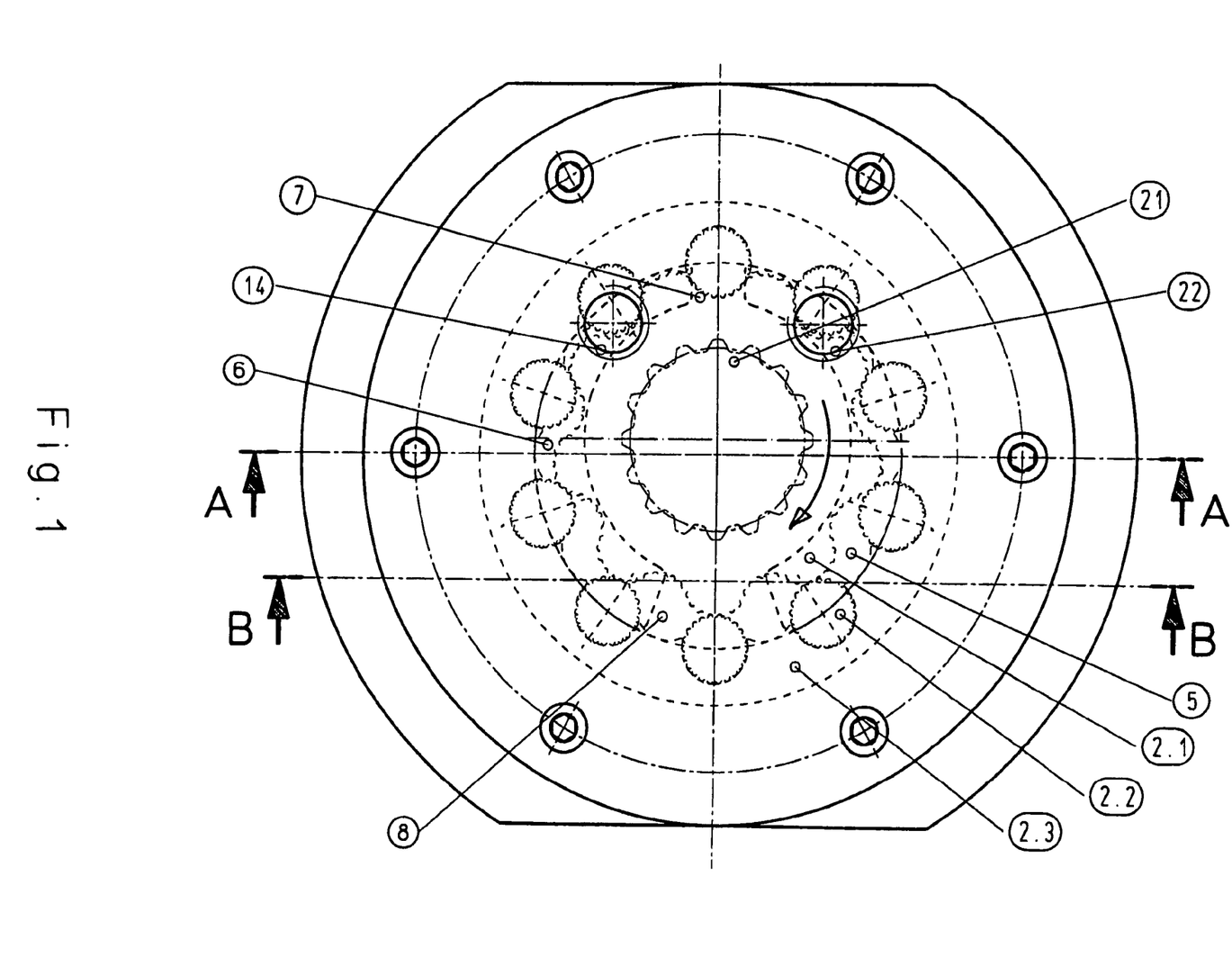

FIG. 1 shows a pre-fabricated pump housing in which a planetary gear set 2 is eccentrically located. The function of the interlocking gear set is that a drive torque affects and turns the inner rotor 2.1 in the direction of the arrow via a drive shaft 21. Whereby the power is transferred from the toothed inner rotor 2.1 to the planetary gear 2.2. This power creates, on the one hand, a percussive force through the center of the planetary gear and also a tangential force. The tangential force affects a drive torque of the planetary gear 2.2, whereby the percussive force, which affects the bearing ring 2.3 and shifts this bearing ring in rotation.

Figure 21:
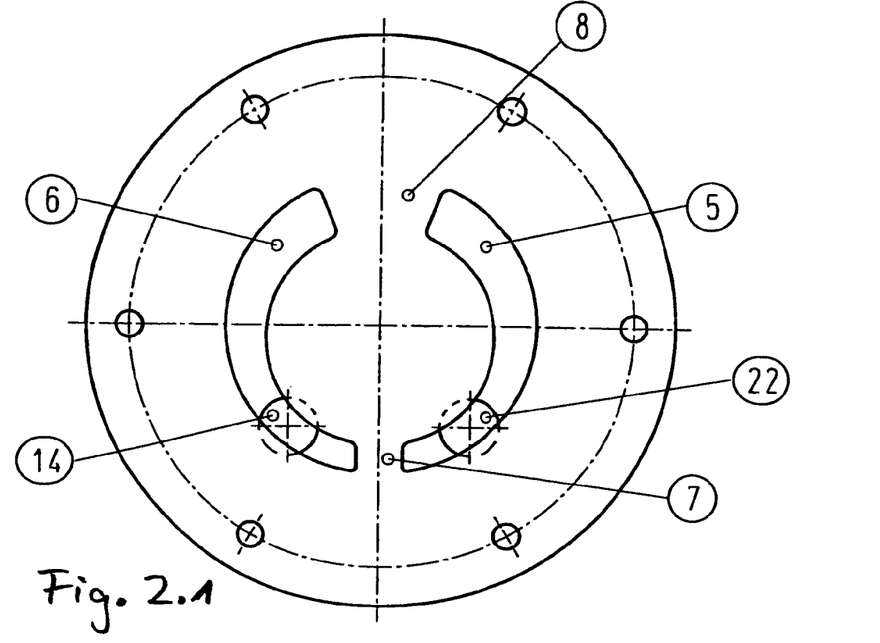
Figure 22:
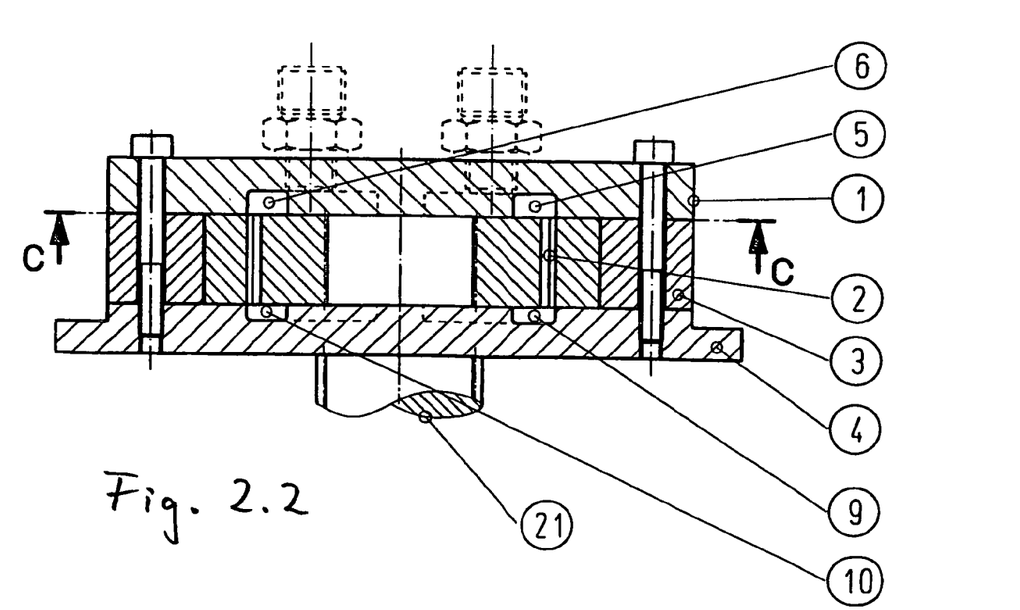

FIG. 2.1 shows a cross-section along the line C-C from FIG. 2.2 through the pre-fabricated pump housing, according to the state of the art concerning the suction and pressure slits as well as the sealing webs. The pump cover 1 shows the recessed suction slit 5 and the recessed pressure slit 6, both incorporated [in the pump cover]. The suction slit 5 and the pressure slit 6 are divided from each other by the sealing web 7 and the diametrically opposite sealing web 8 within the contact area of planetary gear 2. Furthermore, the suction slit 5 and the pressure slit 6 are provided with a suction port 22 and a pressure port 14.

FIG. 2.2 shows a cross-section through a pre-fabricated pump housing, according to the state of the art concerning the suction and pressure slits as well as the sealing webs. The pump housing is composed of a pump ring plate 3, in which the planetary gear 2 is eccentrically located. The pump ring plate 3 and the therein eccentrically located planetary gear 2 are axially sealed by the pump cover 1 and the pump flange 4. The recessed suction slit 5 and the recessed pressure slit 6 are incorporated into the pump cover 1. Furthermore, the suction slit 5 and the pressure slit 6 are provided with a suction port 22 and a pressure port 14. The recessed dummy suction slit 9 and the recessed dummy pressure slit 10 are incorporated into the pump flange 4. The geometry corresponds exactly to that of the suction slit 5 and the pressure slit 6.

Figure 3:
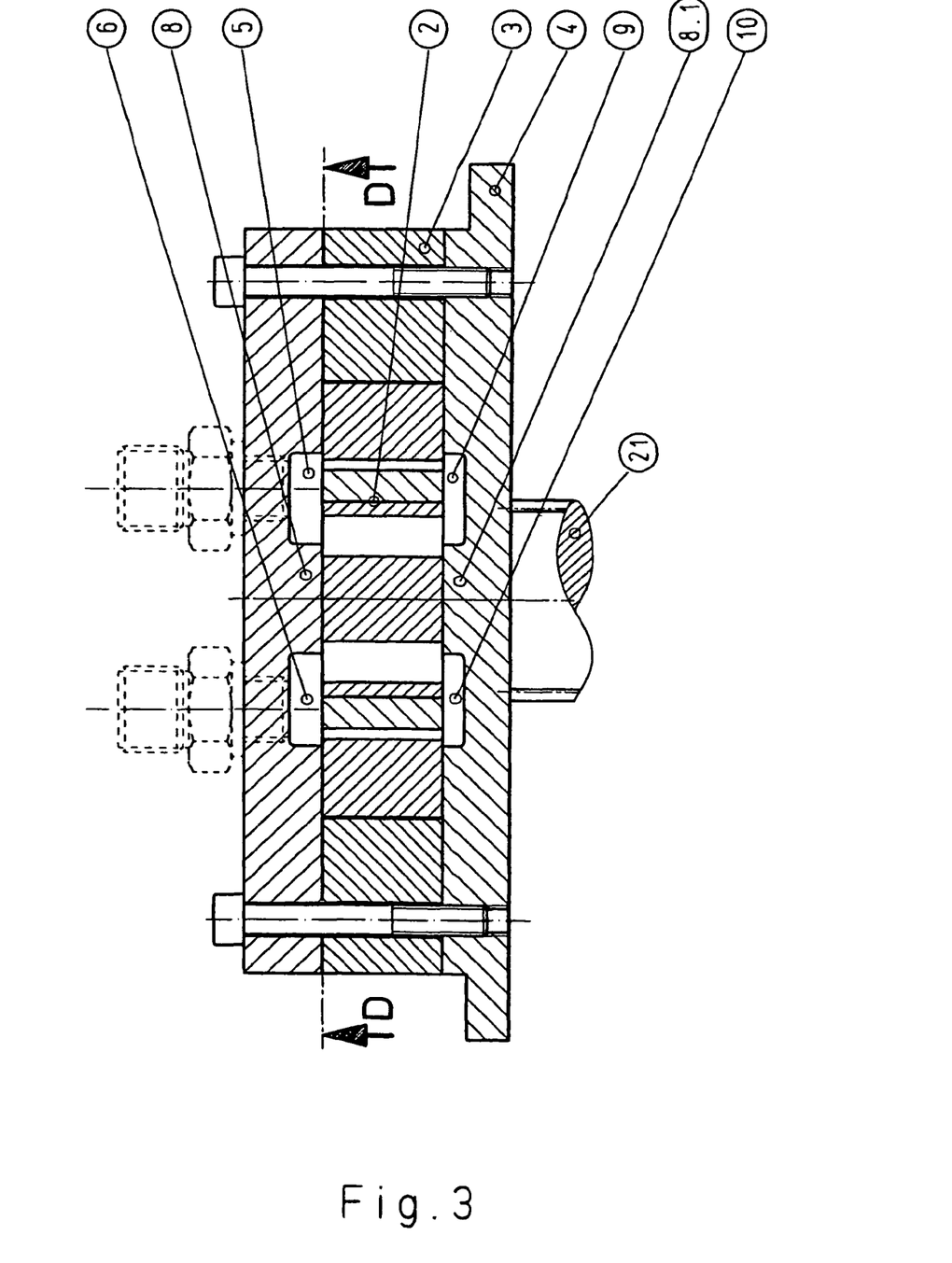

FIG. 3 shows a cross-section along the line B-B from FIG. 1 through the pre-fabricated pump housing, according to the invention, composed of a pump cover 1, a pump ring plate 3, a planetary gear 2 and a pump flange 4, whereby the planetary gear 2 has an inner rotor 2.1, planetary rotors 2.2 and the bearing ring 2.3 for the planetary rotors. The inner rotor 2.1 is driven by the drive shaft 21. The recessed suction slit 5 and the recessed pressure slit 6 are incorporated into the pump cover 1. The sealing web 8 separates the suction slit 5 from the pressure slit 6. A planetary gear 2 is eccentrically located in the pump ring plate 3. The recessed dummy suction slit 9 and the recessed dummy pressure slit 10 are incorporated into the pump flange 4. The sealing web 8.1 separates the dummy suction slit 9 from the dummy pressure slit 10. Furthermore, the sealing web 8 and the sealing web 8.1 axially seal the displacement chamber 20 of the planetary gear 2.

Figure 4:
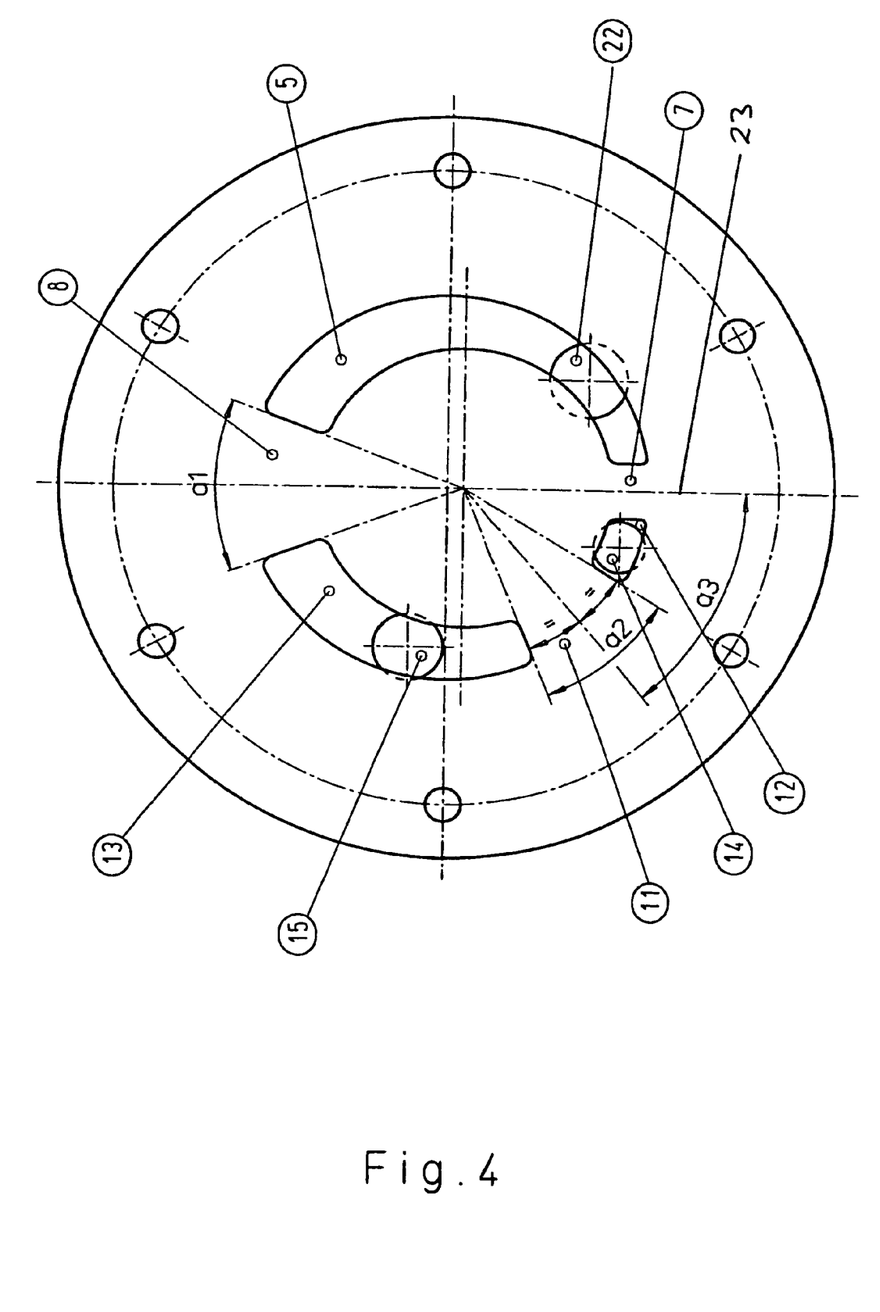
Figure 6:
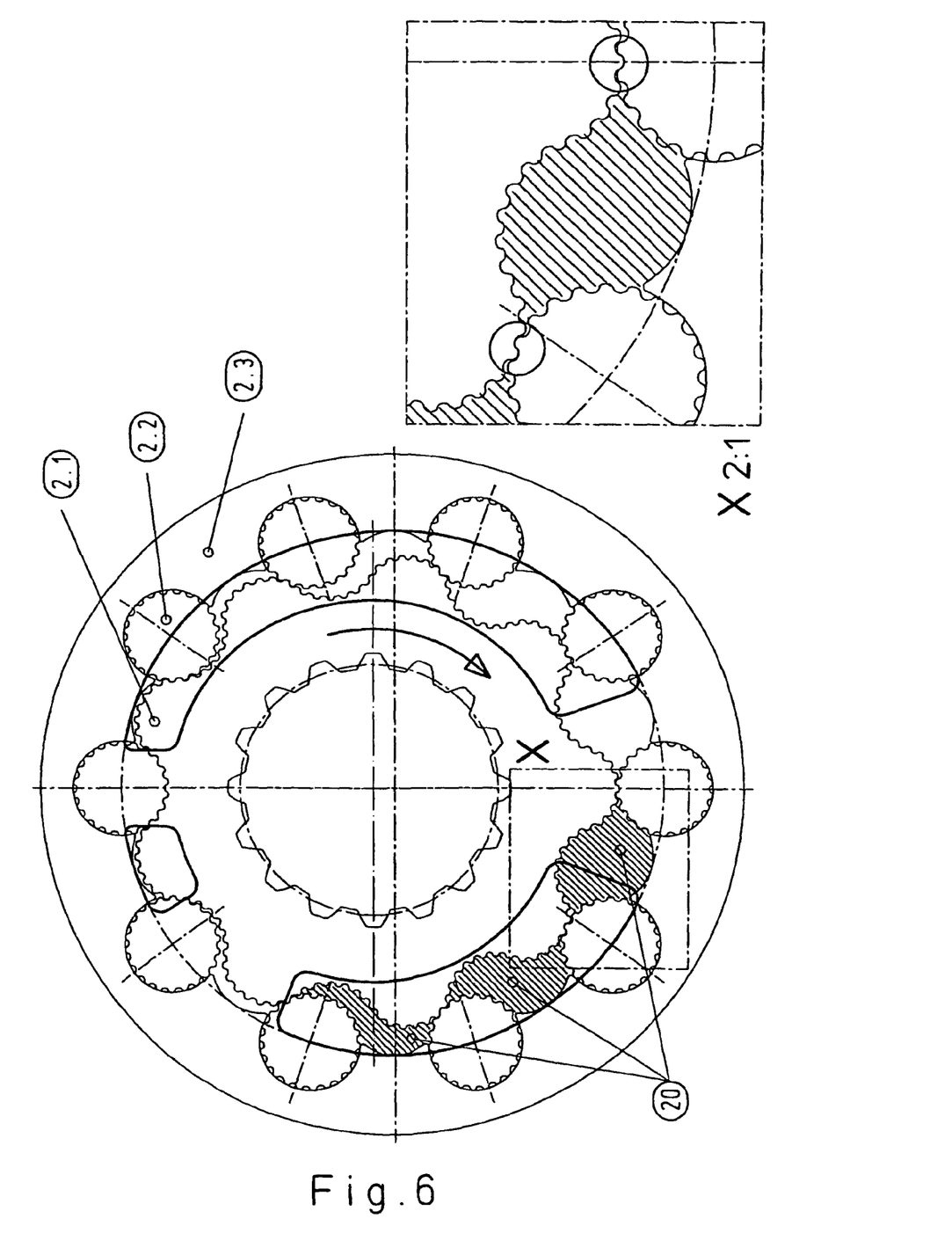

FIG. 4 shows a cross-section along the line D-D from FIG. 3. The view shows the pump cover 1 wherein the recessed suction slit 5 and the recessed pressure slit 6 are incorporated. The suction slit 5 is provided with a suction port 22. The pressure slit 6 is divided into a low pressure chamber 13 and a high pressure chamber 12 by an additional sealing web 11. The sealing web 8, which is located opposite the contact area of the planetary gear 2, separates the suction slit 5 from the low pressure chamber 13. The sealing web 11 separates the low pressure chamber 13 from the high pressure chamber 12. The high pressure chamber 12 is divided from the suction slit 5 by the sealing web 7, which is located in the contact area of the planetary gear 2. The low pressure chamber 13 is provided with the pressure port 15, and the high pressure chamber 12 with the pressure port 14. The sizes of the angles α1 and α2 of the sealing webs 8 and 11 must be so configured, that the sealing webs overlie the two contact points between the toothed inner rotor 2.1 and both planetary rotors 2.2. The angles $\alpha_1$ and $\alpha_2$ are equivalent (FIG. 6 detail X). The angle $\alpha_3$ determines the position of the sealing web 11 and by this means the sizes of the low pressure chamber 13 and the high pressure chamber 12, through which the division of the volume streams follows.

Figure 5:
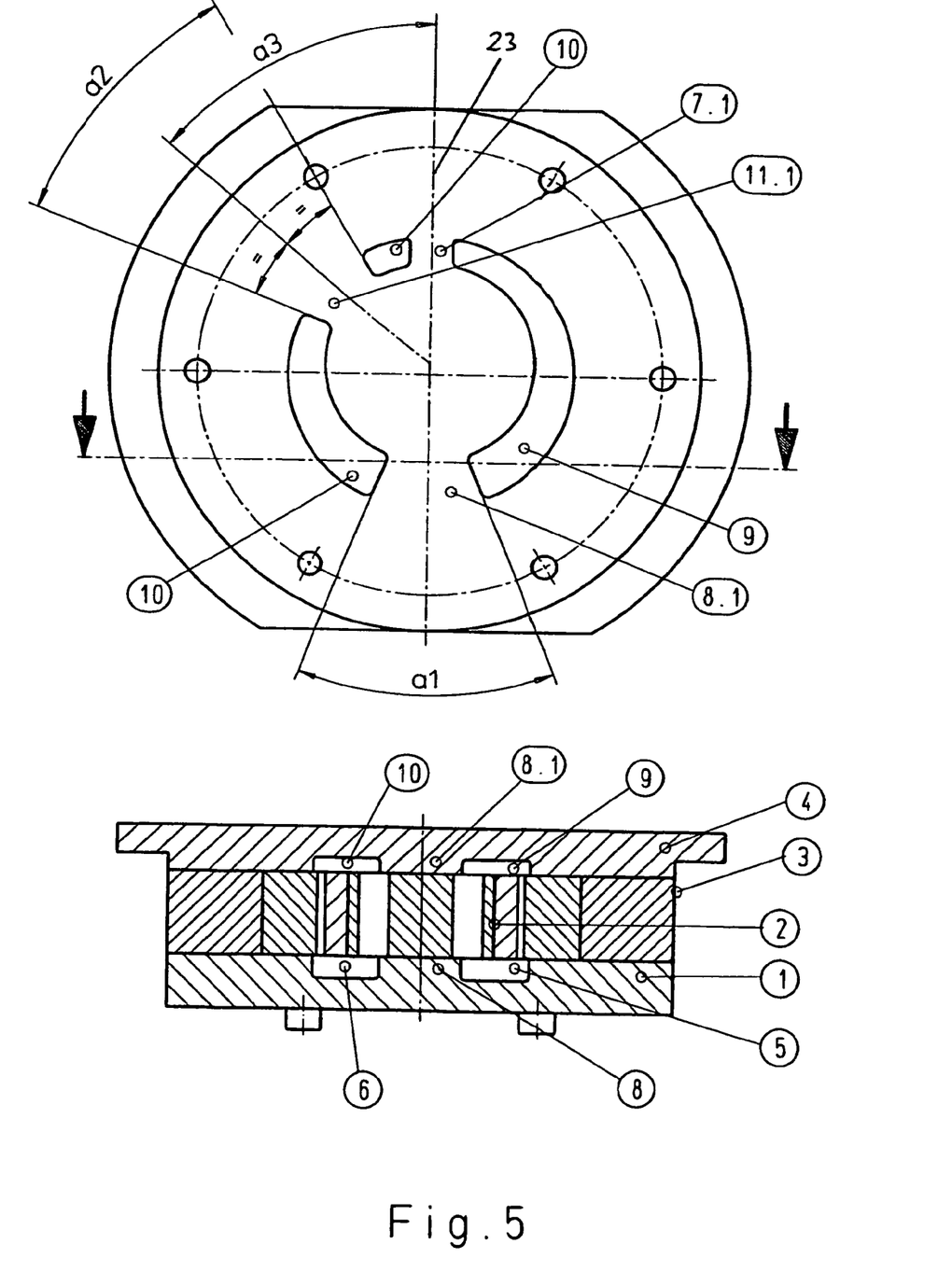

FIG. 5 shows the pump flange 4, wherein the recessed dummy suction slit 9 and the recessed dummy pressure slit 10, which are themselves separated by the sealing web 11.1, are incorporated. The arrangement is the same as in FIG. 4.

FIG. 6 shows the view and location of the displacement chamber 20 above the suction slit 5, the low pressure chamber 13, and the high pressure chamber 12. In the area of the low pressure chamber 13 and the high pressure chamber 12, one sees that the volume of the displacement chamber 20 is continuously decreased, whereby an increase in pressure is achieved. The highest pressure occurs at pressure port 14 of the high pressure chamber 12. Detail X shows the contact points (radial surfaces) between the inner rotor 2.1 and the planetary gears 2.2, which radially seal the displacement chamber 20 by the interlocking of the micro toothing.

Figure 7:
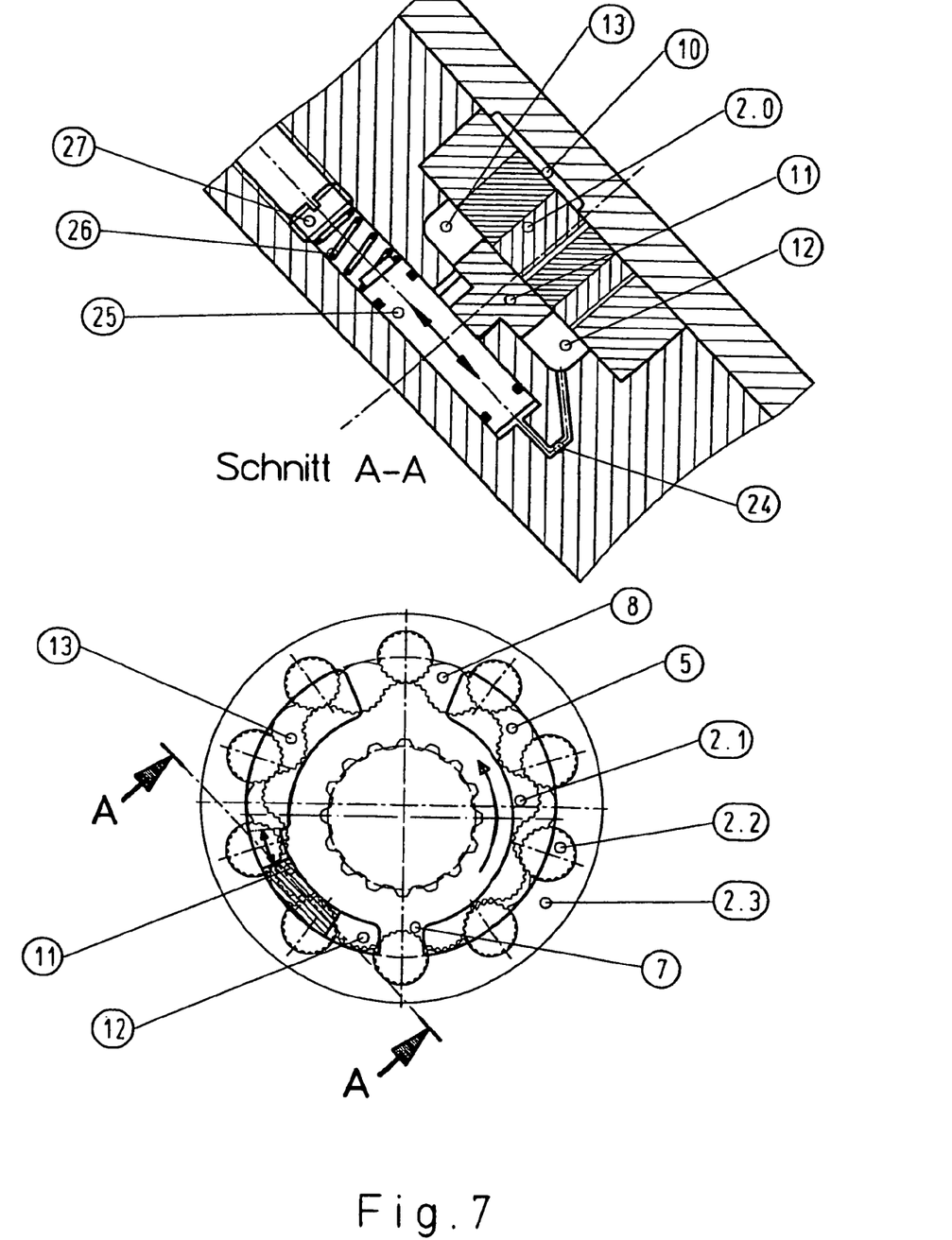

FIG. 7 shows the top view of pump cover 1 wherein the recessed suction slit 5 and recessed pressure slit 6 are incorporated. The pressure slit 6 is divided into a low pressure chamber 13 and a high pressure chamber 12 by mounting a moveable sealing web 11. Cross-section A-A shows one possibility of configuring the moveable sealing web 11. The sealing web 11 is connected to a control piston 25, which control piston is located perpendicular to the drive shaft 21. There is pre-tensioned pressure spring 26 that affects the control piston 25, thus generating the necessary limit pressure. When the limit pressure is exceeded in the high pressure chamber 12, the control piston 25 is frontally pressure loaded via the pressure channel 24. This moves the control piston against the spring tension and against the running direction of the planetary gear 2. Simultaneously, the sealing web 11, which is connected to the control piston 25, is pushed against the running direction of the planetary gear, whereby the high pressure chamber 12 is enlarged and the low pressure chamber 13 is reduced. That causes the volume stream of the high pressure chamber 12 to become greater and the volume stream of the low pressure chamber 13 to become smaller. For sealing the control piston 25, a seal is provided.

Figure 8:
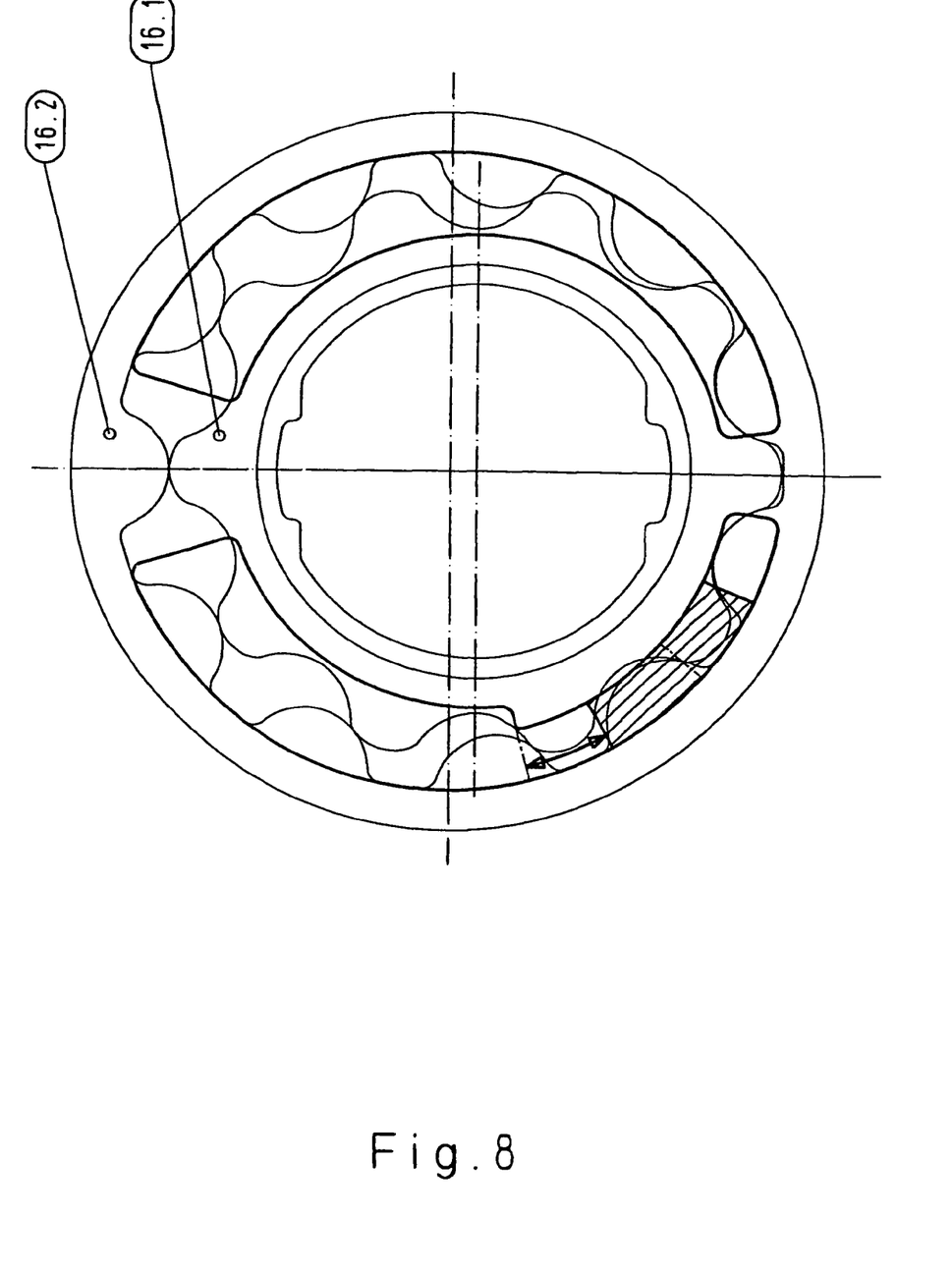

FIG. 8 shows a gerotor gear with an inner rotor 16.1 and an outer rotor 16.2, whereby the gerotor functions in a fashion similar to the planetary gear 17. According to the invention, the configuration and arrangement of the suction slits, pressure slits, dummy slits and sealing webs are similar to those shown in FIGS. 4, 5, and 7.

Figure 9:
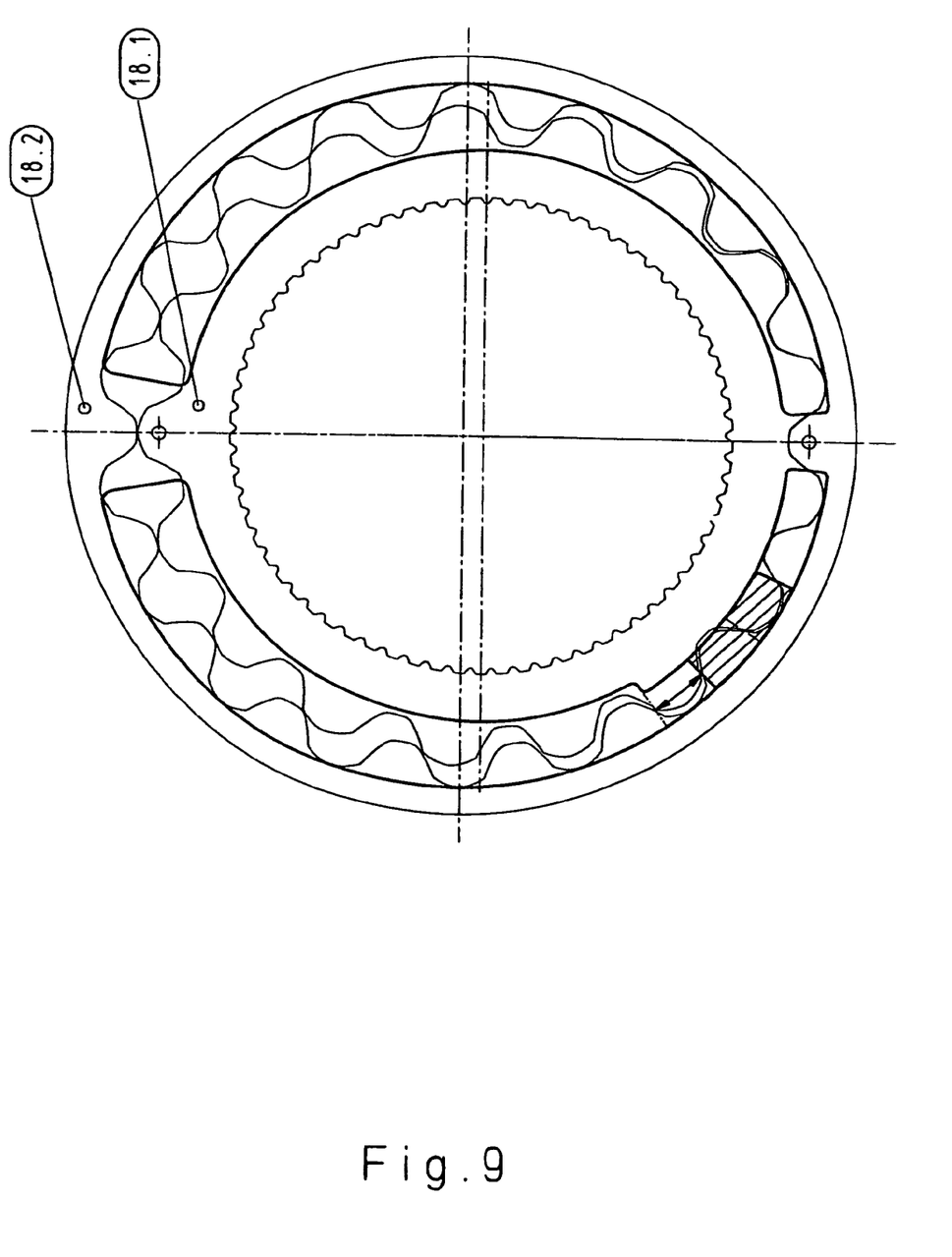

FIG. 9 shows a duocentric gear with an inner rotor 18.1 and an outer rotor 18.2, whereby the duocentric gear functions in a fashion similar to the planetary gear 17. According to the invention, the configuration and arrangement of the suction slits, pressure ports, dummy slits and sealing webs are similar to those shown in FIGS. 4, 5, and 7.

Figure 10:
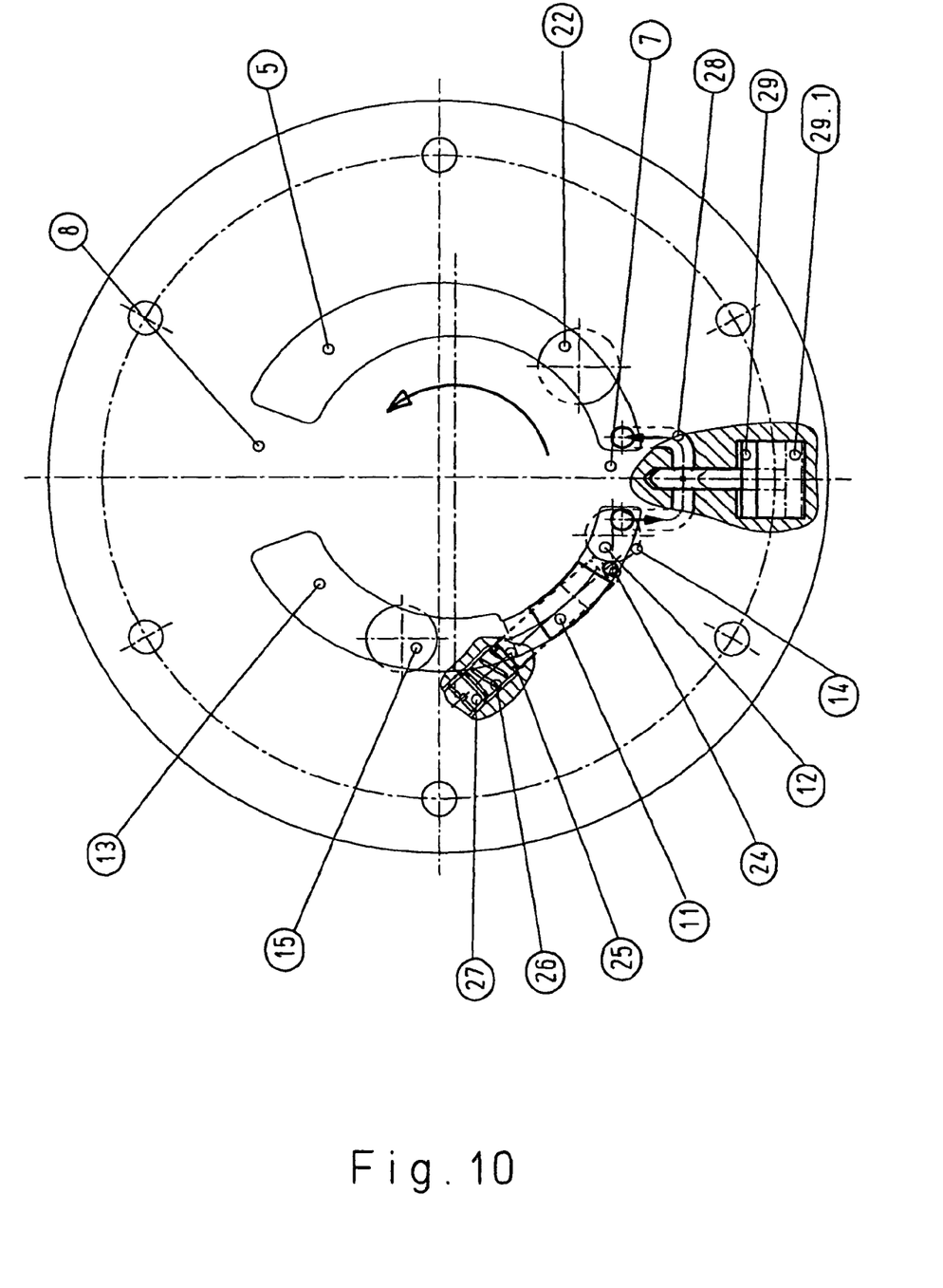

FIG. 10 shows the pump cover 1 wherein the recessed suction slit 5 and the recessed pressure slit 6 are incorporated. The pressure slit 6 is divided into a low pressure chamber 13 and a high pressure chamber 12 by mounting a moveable sealing web 11. The sealing web 11 is connected to a control piston 25, which control piston is located perpendicular to the drive shaft 21. There is pre-tensioned pressure spring 26 that affects the control piston 25, thus generating the necessary limit pressure. A bypass control is mounted is the area of sealing web 7. The bypass bore hole 28 connects the high pressure chamber 12 with the suction slit 5. The bypass bore hole 28 is closed or opened by the disposition of a regulating pin 29 and 29.1. The position of the regulating pin 29 disconnects the bypass bore hole 28 and separates the high pressure chamber 12 from the suction slit 5 by means of the sealing web 7. The position of the regulating pin 29.1 opens the bypass bore hole 28 and makes a connection (Bypass) between the high pressure chamber 12 and the suction slit 5. The medium displaced into the high pressure chamber 12 can thus flow out unpressurized into the suction slit 5. The control by means of the regulating pin 29, 29.1 can be accomplished cost efficiently by a 2/2 electrical directional control valve that has a fast response time. By this means, the possibility exists to quickly connect and disconnect the volume stream of the high pressure chamber 12. When the bypass bore hole 28 is closed, pressure is increased in the high pressure chamber 12, which pressure affects the control piston 25 via a pressure channel 24. When the preset limit pressure has been exceeded in the high pressure chamber 12, the control piston 25 is shifted against the tension of the pressure spring 26. Because the control piston 25 is connected to the sealing web 11, the sealing web 11 is shifted against the running direction of the planetary gear 2. The high pressure chamber 12 is increased by this [action] and the volume stream increases correspondingly.

What is claimed:

1. A pump for generating at least two volume streams with different pressure, comprising a pump cover, a pump housing, and a planetary gear system that is eccentrically located within the housing, the planetary gear system having an inner rotor and a plurality of outer rotors in communication with the inner rotor, each of said outer rotors being disposed in a respective bore hole defined by a bearing ring, the pump housing having a suction slit and a pressure slit, which the suction slit and the pressure slit are separated from each other by an initial sealing web and a diametrically opposed second sealing web, the pressure slit is divided into a high pressure chamber and a low pressure chamber by at least one additional sealing web, and each of said high pressure chamber and low pressure chamber having a pressure port, wherein (i) the high pressure chamber is adapted to provide a first volume stream for use external to the pump and the low pressure chamber is adapted to provide a second volume stream for use external to the pump, (ii) the high pressure chamber is adapted to provide a higher pressure than the low pressure chamber, and (iii) the size of the high pressure chamber and the low pressure chamber is variable.

2. A pump according to claim 1, wherein the planetary gear system is configured as a gerotor gear.

3. A pump according to one of the claim 1, wherein the planetary gear system is configured as a duocentric gear.

4. A pump according to one of the claim 1, wherein a dummy suction slit and a dummy pressure slit are incorporated into the pump cover, the dummy suction slit and the dummy pressure slit are respectively located opposite the suction slit and the pressure slit and have an identical geometry.

5. A pump according to one of the claim 1, wherein the additional sealing web is placed at an angle $\alpha_1$, from 30° to 120° to the axis.

6. A pump according to one of the claim 5, wherein the second sealing web and the additional sealing web extend at an angle $\alpha_1$, $\alpha_2$, from 20° to 80°.

7. A pump according to one of the claim 1, wherein the additional sealing web is moveable and is located in the pump cover and/or in the pump housing.

8. A pump according to one of the claim 1, wherein the pump cover, the pump housing, and or the gear system are constructed of sintered metal.

9. A pump according to claim 1, wherein the high pressure chamber is adapted to provide a pressure between 40 and 120 bar.

10. A pump according to claim 9, wherein the high pressure chamber is adapted to provide a pressure between 80 and 100 bar.

11. A pump according to claim 1, wherein the low pressure chamber is adapted to provide a maximum pressure of 6 bar.

12. A pump according to claim 1, wherein the high pressure chamber is adapted to provide a pressure between 40 and 120 bar, and the low pressure chamber is adapted to provide a maximum pressure of 6 bar.

13. A pump according to claim 1, wherein the high pressure chamber is adapted to provide a pressure of at least 20 bar greater than the pressure in the low pressure chamber.

14. A method generating at least two volume streams with different pressure, comprising the steps of:

provesing a pump comprising a pump cover, a pump housing, and a planetary gear system that is eccentrically located within the housing, the planetary gear system having an inner rotor and a plurality of outer rotors in communication with the inner rotor, each of said outer rotors being disposed in a respective bore hole defined by a bearing ring, the pump housing having a suction slit and a pressure slit, which the suction slit and the pressure slit are separated from each other by an initial sealing web and a diametrically opposed second sealing web, the pressure slit is divided into a high pressure chamber and a low pressure chamber by at least one additional sealing web, and each of said high pressure chamber and low pressure chamber having a pressure port, wherein (i) the high pressure chamber is adapted to provide a first volume stream for use external to the pump and the low pressure chamber is adapted to provide a second volume stream for use external to the pump, (ii) the high pressure chamber is adapted to provide a higher pressure than the low pressure chamber, and (iii) the size of the high pressure chamber and the low pressure chamber is variable; and employing the pump for operation of a camshaft adjuster, for engine lubrication, for transmission lubrication and/or assistance in shifting gears.

\* \* \* \* \*